(12) United States Patent
Hooker et al.

(10) Patent No.: US 10,387,318 B2
(45) Date of Patent: *Aug. 20, 2019

(54) PREFETCHING WITH LEVEL OF AGGRESSIVENESS BASED ON EFFECTIVENESS BY MEMORY ACCESS TYPE

(71) Applicant: VIA ALLIANCE SEMICONDUCTOR CO., LTD., Shanghai (CN)

(72) Inventors: Rodney E. Hooker, Austin, TX (US); Douglas R. Reed, Austin, TX (US); John Michael Greer, Austin, TX (US); Colin Eddy, Austin, TX (US)

(73) Assignee: VIA ALLIANCE SEMICONDUCTOR CO., LTD, Shanghai (CN)

( * ) Notice: Subject to any disclaimer, the term of this patent is extended or adjusted under 35 U.S.C. 154(b) by 495 days.

This patent is subject to a terminal disclaimer.

(21) Appl. No.: 14/891,330

(22) PCT Filed: Dec. 14, 2014

(86) PCT No.: PCT/IB2014/003175
§ 371 (c)(1),
(2) Date: Nov. 14, 2015

(87) PCT Pub. No.: WO2016/097794
PCT Pub. Date: Jun. 23, 2016

(65) Prior Publication Data
US 2017/0123985 A1    May 4, 2017

(51) Int. Cl.
*G06F 12/0862* (2016.01)
*G06F 9/345* (2018.01)
(Continued)

(52) U.S. Cl.
CPC ........ *G06F 12/0862* (2013.01); *G06F 8/4442* (2013.01); *G06F 9/30043* (2013.01);
(Continued)

(58) Field of Classification Search
CPC ............. G06F 12/0862; G06F 12/0875; G06F 12/1009; G06F 12/30043; G06F 9/3802; G06F 2212/1024; G06F 2212/452
See application file for complete search history.

(56) References Cited

U.S. PATENT DOCUMENTS 5,649,144 A * 7/1997 Gostin ................ G06F 9/30043
711/137
5,796,971 A * 8/1998 Emberson ............. G06F 9/3802
711/122

(Continued)

FOREIGN PATENT DOCUMENTS

| CN | 102214146 A | 10/2011 |
| EP | 1783603 A2 | 5/2007 |
| WO | WO2006038991 | 4/2006 |

OTHER PUBLICATIONS

D. M. Koppelman, "Neighborhood prefetching on multiprocessors using instruction history," Proceedings 2000 International Conference on Parallel Architectures and Compilation Techniques (Cat. No. PR00622), Philadelphia, PA, 2000, pp. 123-132. (Year: 2000).*

(Continued)

*Primary Examiner* — Ramon A. Mercado
(74) *Attorney, Agent, or Firm* — McClure, Qualey & Rodack, LLP

(57) ABSTRACT

A processor includes a prefetcher that prefetches data in response to memory accesses, wherein each memory access has an associated memory access type (MAT) of a plurality of predetermined MATs. The processor also includes a table that holds scores that indicate effectiveness of the prefetcher to prefetch data with respect to the plurality of predeter- (Continued)

mined MATs. The prefetcher prefetches data in response to memory accesses at a level of aggressiveness based on the scores held in the table and the associated MATs of the memory accesses.

25 Claims, 10 Drawing Sheets

(51) Int. Cl.
| | | |
|---|---|---|
| *G06F 9/38* | (2018.01) | |
| *G06F 11/30* | (2006.01) | |
| *G06F 8/41* | (2018.01) | |
| *G06F 9/30* | (2018.01) | |
| *G06F 12/0875* | (2016.01) | |
| *G06F 12/1009* | (2016.01) | |
| *G06F 12/127* | (2016.01) | |

(52) U.S. Cl.
CPC .......... *G06F 9/3455* (2013.01); *G06F 9/3802* (2013.01); *G06F 9/383* (2013.01); *G06F 11/30* (2013.01); *G06F 12/0875* (2013.01); *G06F 12/1009* (2013.01); *G06F 12/127* (2013.01); *G06F 2212/1024* (2013.01); *G06F 2212/452* (2013.01); *G06F 2212/502* (2013.01); *G06F 2212/602* (2013.01); *G06F 2212/6026* (2013.01); *Y02D 10/13* (2018.01)

(56) References Cited

U.S. PATENT DOCUMENTS

| | | | |
|---|---|---|---|
| 7,107,384 B1 | 9/2006 | Chen et al. | |
| 8,327,077 B2* | 12/2012 | Boyle | G06F 12/0862 711/137 |
| 8,762,649 B2 | 6/2014 | Hooker et al. | |
| 9,304,927 B2* | 4/2016 | Durbhakula | G06F 12/0862 |
| 9,817,764 B2* | 11/2017 | Hooker | G06F 9/30047 |
| 2003/0084433 A1* | 5/2003 | Luk | G06F 8/4442 717/158 |
| 2003/0093636 A1 | 5/2003 | Henry et al. | |
| 2004/0243767 A1* | 12/2004 | Cierniak | G06F 9/383 711/137 |
| 2005/0149915 A1* | 7/2005 | Wu | G06F 9/45516 717/137 |
| 2007/0094453 A1* | 4/2007 | Santhanakrishnan | G06F 9/383 711/137 |
| 2007/0204267 A1 | 8/2007 | Cole et al. | |
| 2008/0016330 A1* | 1/2008 | El-Essawy | G06F 9/3455 712/225 |
| 2011/0066811 A1 | 3/2011 | Sander et al. | |
| 2011/0238922 A1* | 9/2011 | Hooker | G06F 12/0862 711/137 |
| 2012/0144124 A1* | 6/2012 | Lepak | G06F 12/0862 711/137 |
| 2012/0226888 A1* | 9/2012 | Rychlik | G06F 12/1027 711/207 |
| 2013/0208796 A1 | 8/2013 | Amitay et al. | |
| 2013/0246708 A1* | 9/2013 | Ono | G06F 12/0862 711/122 |
| 2013/0254485 A1* | 9/2013 | Kannan | G06F 12/0862 711/122 |
| 2014/0052927 A1 | 2/2014 | McCauley et al. | |
| 2014/0108766 A1 | 4/2014 | Desai | |
| 2014/0149668 A1* | 5/2014 | Chaudhary | G06F 12/0862 711/119 |
| 2014/0149678 A1 | 5/2014 | Chaudhary | |
| 2014/0310479 A1 | 10/2014 | Hooker et al. | |
| 2015/0186293 A1* | 7/2015 | Lin | G06F 12/0862 711/123 |
| 2016/0357677 A1 | 12/2016 | Hooker et al. | |

OTHER PUBLICATIONS

Ebrahimi, Eiman, et al. "Techniques for Bandwidth-Efficient Prefetching of Linked Data Structures in Hybrid Prefetching Systems." High Performance Computer Architecture. Feb. 14, 2009. pp. 7-17. XP031435355.

PCT/IB2014/003175. International Search Report (ISR) and Written Opinion (WO). Provided by State Intellectual Property Office of the P.R. China, dated Jun. 26, 2015. pp. 1-10.

PCT/IB2014/003226. International Search Report (ISR) and Written Opinion (WO). Provided by State Intellectual Property Office of the P.R. China, dated Jul. 27, 2015. pp. 1-8.

Office Action dated Nov. 19, 2018, issued in application No. EP 14891604.2.

* cited by examiner

PREFETCHING WITH LEVEL OF AGGRESSIVENESS BASED ON EFFECTIVENESS BY MEMORY ACCESS TYPE

CROSS-REFERENCE TO RELATED APPLICATIONS

This application is related to the following U.S. Non-Provisional application Ser. No. 14/891,331, filed concurrently herewith, which is a national stage application under 35 U.S.C. 371 of International Application PCT/IB2014/003226, filed Dec. 14, 2014, each of which is hereby incorporated by reference in its entirety.

BRIEF SUMMARY

In one aspect the present invention provides a processor. The processor includes a prefetcher that prefetches data in response to memory accesses, wherein each memory access has an associated memory access type (MAT) of a plurality of predetermined MATs. The processor also includes a table that holds scores that indicate effectiveness of the prefetcher to prefetch data with respect to the plurality of predetermined MATs. The prefetcher prefetches data in response to memory accesses at a level of aggressiveness based on the scores held in the table and the associated MATs of the memory accesses.

In another aspect, the present invention provides a method for operating a processor that includes a prefetcher that prefetches data in response to memory accesses, wherein each memory access has an associated memory access type (MAT) of a plurality of predetermined MATs. The method includes maintaining a table that holds scores that indicate effectiveness of the prefetcher to prefetch data with respect to the plurality of predetermined MATs and prefetching, by the prefetcher, data in response to memory accesses at a level of aggressiveness based on the scores held in the table and the associated MATs of the memory accesses.

In yet another aspect, the present invention provides a processor. The processor includes a prefetcher that prefetches data in response to memory accesses, wherein each memory access has an associated memory access type (MAT) of a plurality of predetermined MATs. The processor also includes a table that holds scores that indicate effectiveness of the prefetcher to prefetch data with respect to the plurality of predetermined MATs. The prefetcher prefetches data in response to memory accesses at a level of aggressiveness based on the scores held in the table and the associated MATs of the memory accesses.

DETAILED DESCRIPTION OF THE EMBODIMENTS

Embodiments are described in which a prefetcher in a processor prefetches data in response to memory accesses. Each of the memory accesses has an associated memory access type (MAT) that is provided to the prefetcher along with the other memory access information (e.g., memory address). In one embodiment, there are 32 different MATs. The prefetcher tracks its prefetching effectiveness with respect to each of the MATs and then varies its level of prefetching aggressiveness for each MAT based on its effectiveness for the MAT. In one embodiment, the processor includes two prefetchers, each of which tracks its prefetching effectiveness with respect to each of the MATs. One prefetcher may defer to the other prefetcher with respect to a MAT if the other prefetcher has been more effective prefetching the MAT.

A memory access type (MAT) is a characteristic of a memory access that is derived from either a characteristic of the instruction for which the memory access was generated, or the type of functional unit of the processor that generated the memory access, or the operating mode of the processor when the memory access was generated or the data type being accessed by the memory access.

The operation specified by the instruction is a characteristic of the instruction, for example. Load units, store units, integer units, floating point units, media units, tablewalk engines, instruction fetch units, and hardware prefetchers (e.g., instruction prefetcher, stream prefetcher, box prefetcher, L1D prefetcher) are types of functional unit of the processor, for example. Supervisor mode (or privileged mode, or x86 ring 0), system management mode (e.g., x86 System Management Mode (SMM)), protected mode (e.g., x86 Real Mode, Virtual x86 mode, Protected mode, Long mode), virtual machine mode (e.g., x86 Virtual Machine eXtensions (VMX)), and are operating modes of the processor, for example. Code, descriptor tables (e.g., x86 instruction set architecture global descriptor table (GDT) and interrupt descriptor table (IDT)), page tables, system management mode (e.g., x86 SMM) state save space, virtual machine mode (e.g., x86 VMX) state save space, stack, compressed data, constants, floating point, cryptographic keys, cryptographic payloads, and linked lists are data types accessed, for example.

A memory access generated by an instruction fetch unit may be referred to as a code fetch, and a memory access generated by a hardware instruction prefetcher may be referred to as a code prefetch.

Figure 1:
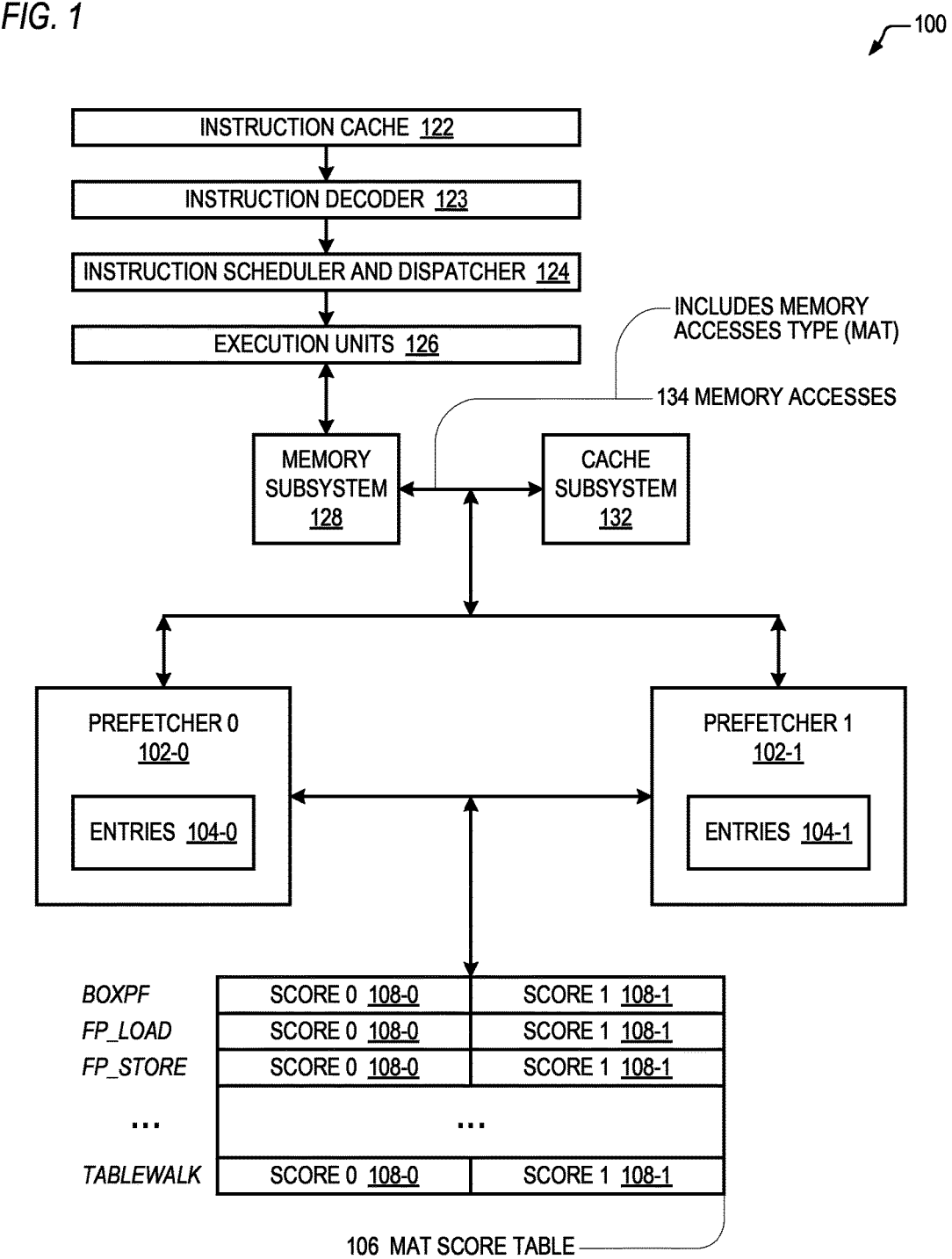
FIG. 1 is a block diagram illustrating a processor.

Referring now to FIG. 1, a block diagram illustrating a processor 100 is shown. The processor 100 includes an instruction cache 122 that provides instructions to an instruction decoder 123 that decodes the instructions and provides the decoded instructions to an instruction dispatcher 124 that dispatches the instructions to execution units 126 for execution. Preferably, the microarchitecture of the processor 100 is superscalar and out-of-order execution, although other embodiments are contemplated, such that the instruction dispatcher 124 also includes an instruction scheduler for scheduling the dispatch of instructions to multiple execution units 126 in a superscalar out-of-order fashion. Preferably, the processor 100 also includes architectural registers (not shown) that hold architectural state of the processor 100 as well as non-architectural registers (not shown). Preferably, the processor 100 also includes a register alias table (RAT) (not shown) used to perform register renaming and a reorder buffer (ROB) (not shown) used to retire instructions in program order. Preferably, the instruction dispatcher includes an instruction translator (not shown) that translates architectural instructions into microinstructions of the microinstruction set architecture of the processor 100 executable by the execution units 126.

The processor 100 also includes a memory subsystem 128 that provides memory operands to the execution units 126 and receives memory operands from the execution units 126. The memory subsystem 128 preferably includes one or more load units, one or more store units, load queues, store queues, a fill queue for requesting cache lines from memory, a snoop queue related to snooping of a memory bus to which the processor 100 is in communication, a tablewalk engine, and other related functional units.

The processor 100 also includes a cache subsystem 132 in communication with the memory subsystem 128. Preferably, the cache subsystem 132 includes a hierarchy of cache memories, such as the level-1 (L1) instruction cache 122, a L1 data cache, and a unified level-2 (L2) cache that backs the L1 caches. In one embodiment, the cache subsystem 132 also includes a level-3 (L3) cache. In one embodiment, the processor 100 is a multi-core processor, each of the cores having the functional units described above, and in which the cache subsystem 132 includes cache memories that are shared by the cores.

The memory subsystem 128 makes memory accesses 134 of the cache subsystem 132. The memory accesses 134 include a memory address of the memory location to be accessed. Each of the memory accesses 134 also includes a memory access type (MAT), which is one of a plurality of predetermined MATs, embodiments of which are described herein in more detail, including an example embodiment with respect to Table 1 below.

The processor 100 also includes two prefetchers, prefetcher 0 102-0 and prefetcher 1 102-1, referred to collectively as prefetchers 102 and generically individually as prefetchers 102. Other embodiments are contemplated in which the number of prefetchers 102 is different than two. The prefetchers 102 employ different methods for prefetching data. A prefetcher 102 prefetches according to a method that it employs to predict the one or more locations from which to fetch the data. For example, a simple method is a next sequential method according to which the prefetcher 102 examines the location of a memory access of a stream of memory accesses made by a program and predicts the program will access data from the next sequential location. (Typically, an entire cache line is prefetched into a cache memory of the processor. Hence, the prefetcher 102 prefetches a cache line amount of memory locations that are next to the cache line worth of memory locations that includes the data specified by the program access.) The next sequential cache line may be in either an upward or downward direction in memory from the location of the program stream access. The prefetcher 102 may look at two adjacent accesses in the stream to determine the upward or downward direction. For another example, according to a stride detection method, the prefetcher may detect a stride pattern between temporally adjacent memory accesses of the stream and predict based on the stride. That is, the prefetcher 102 looks for a gap distance between the temporally adjacent memory accesses and predicts that subsequent program accesses will be from locations that are the gap distance away from each other. For example, the prefetcher may see a stream that accesses locations 4, 8 and 12 and detects a gap distance of 4 and predicts the next access will be at 16. Prefetchers 102 that employ more sophisticated stride methods may detect streams with different gap distances that appear in a pattern. For example, the prefetcher 102 may see a stream that accesses locations 4, 8, 10, 14 and 16 and detect a first gap distance of 4 and a second gap distance of 2 and predict the next two accesses will be at 20 and 22. For yet another example, the prefetcher 102 may employ a method by which it detects a memory access pattern within a memory block that is relatively independent of the temporal order in which the accesses occur. Examples of such methods are employed in a "bounding box prefetcher" described substantially according to U.S. Pat. Nos. 8,645,631, 8,719,510, 8,762,649, and 8,880,807, each of which is hereby incorporated by reference herein in its entirety for all purposes.

Each of the prefetchers 102 includes entries 104, which are described in more detail below with respect to FIG. 2 and which hold information and include logic used by the prefetcher 102 to prefetch data. In one embodiment, the prefetchers 102 are associated with a last level cache (LLC) memory of the cache subsystem 132 of the processor 100. In one embodiment, the processor 100 comprises a plurality of processing cores that share the LLC. Preferably, the LLC receives the memory accesses 134, or memory access requests 134, from the memory subsystem 128 of each of the cores as well as external memory accesses (e.g., snoops) from other cores, cache memories and peripheral devices (e.g., direct memory accesses) of the system that comprises the processor 100.

The processor 100 also includes a memory access type (MAT) score table 106. The MAT score table 106 holds scores 108 that indicate the effectiveness of the prefetchers 102. Preferably, the MAT score table 106 is a two-dimensional matrix that includes a column associated with each of the prefetchers 102; hence, the scores associated with prefetcher 0 102-0 are referred to as score 0 108-0 and the scores associated with prefetcher 1 102-1 are referred to as score 1 108-1. Each row of the MAT score table 106 corresponds to a different MAT. Table 1 below lists the different MATs according to one embodiment and describes each of the MATs based on its source.

In the embodiment of Table 1, there are 32 different MATs. However, other embodiments are contemplated with different numbers of MATs and different MATs. For example, the list of MATs may also include a memory access generated by an instruction fetch, also referred to as a code fetch, and a memory access generated by an instruction prefetch, or code prefetch.

TABLE 1

| Memory Access Type (MAT) | Description |
| --- | --- |
| boxpf | Load generated by bounding box hardware data prefetcher of the processor |
| fp_load | Load generated by floating point instruction |
| fp_store | Store generated by floating point instruction |
| fused_fp_store | Store generated by a fused microinstruction into which a floating point instruction was translated |
| fused_load | Load generated by a fused microinstruction into which a load instruction was translated |

TABLE 1-continued

| Memory Access Type (MAT) | Description |
| --- | --- |
| fused_store | Store generated by a fused microinstruction into which a store instruction was translated |
| fused_store_aps | Store generated by a fused microinstruction into which a media instruction was translated |
| fused_store_update | Store generated by a fused microinstruction into which an instruction that modifies an address (e.g., in stack pointer register implicit in x86 PUSH or POP, or string address register implicit in x86 REP MOVS) was translated |
| gpf | Load generated by guaranteed prefetch instruction |
| l1dpf | Load generated by L1 data cache hardware prefetcher of the processor |
| load | Load (basic) |
| load_aps | Load generated by media instruction |
| load_descr | Load of a descriptor (e.g., x86 descriptor) |
| load_nac | Load that performs no alignment check (e.g., will not cause x86 #AC exception) |
| load_nt | Load of non-temporal data |
| load_store | Load and store |
| load_supervisor | Load generated by instruction at supervisor privilege level |
| load_zx | Load generated by zero extend instruction (e.g., x86 MOVZX) |
| pf_l1d | Load into L1 data cache generated by software prefetch instruction (e.g., x86 PREFETCHT0/T1) |
| pf_l2 | Load into L2 cache generated by software prefetch instruction (e.g., x86 PREFETCHT2) |
| pf_nt | Load into non-temporal cache generated by software prefetch instruction (e.g., x86 PREFETCHNTA) |
| pf_w | Load into cache in anticipation of a write generated by software prefetch instruction (e.g., x86 PREFETCHW) |
| store | Store (basic) |
| store_aps | Store generated by media instruction |
| store_mask | Store of non-temporal data generated by a masked move instruction (e.g., x86 MASKMOVQ) |
| store_nt | Store of non-temporal data |
| store_nt_aps | Store of non-temporal data generated by a media instruction |
| store_push | Store generated by a push instruction (e.g., x86 PUSH) that stores data on a stack in memory (e.g., specified by the x86 stack pointer register value) |
| store_supervisor | Store generated by instruction at supervisor privilege level |
| store_update | Store generated by an instruction that modifies an address (e.g., in stack pointer register or string address register) |
| store_update_nac | Store generated by an instruction that modifies an address (e.g., stack address or string address) and that performs no alignment check (e.g., will not cause x86 #AC exception) |
| tablewalk | Load or store generated by hardware tablewalk engine of the processor |

In one embodiment, the instructions are microinstructions generated by an instruction translator of the processor 100 that translates architectural instructions (e.g., x86 instruction set architecture instructions) into the microinstructions.

In one embodiment, the processor 100 is configured with the scores 108 held in the MAT score table 106 at manufacturing time. For example, the designers of the processor 100 may run performance tests (e.g., using software simulation models of the processor 100) with different scores 108 in the table 106 to determine which scores 108 produce the best overall performance. In one embodiment, the table 106 scores 108 remain static during operation of the processor 100. However, in other embodiments, the initial scores 108 serve as default values of the table 106, and the scores 108 are dynamically updated during operation of the processor 100, such as according to embodiments described herein, such as based on the effectiveness of the prefetcher 102 for recently processed memory accesses. In yet another embodiment, the scores 108 are updated with program-specific values in response to detecting that the particular program is now running on the processor 100. The program-specific scores 108 may have been previously obtained by analyzing performance of the program with different table 106 scores 108 to determine the best-performing values.

Figure 2:
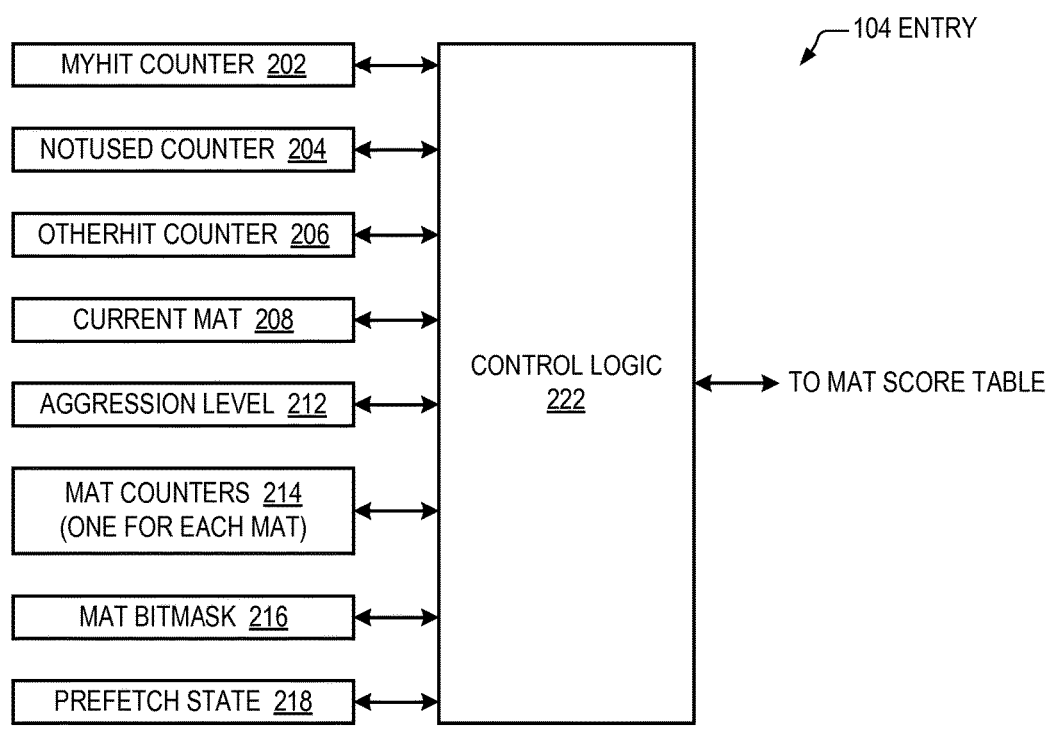
FIG. 2 is a block diagram illustrating an entry of FIG. 1.

Referring now to FIG. 2, a block diagram illustrating an entry 104 of FIG. 1 is shown. The entry 104 includes control logic 222 that communicates with the MAT score table 106 to read values from it and to write values to it. The entry 104 also includes a MYHIT counter 202, a NOTUSED counter 204, a OTHERHIT counter 206, a current MAT register 208, an aggression level register 212, MAT counters 214, a MAT bitmask 216, and additional prefetch state 218, all in communication with the control logic 222. Each of the prefetchers 102 has an associated pool of entries 104 from which it can allocate in order to track information about accesses to a memory region (also referred to as a memory block or stream) and use the information to make prefetches within the memory region. For example, the memory region may correspond to a page of physical memory, or a subset thereof, or a group of pages. The size of the pool of entries 104 of each of the prefetchers 102 may be different. The prefetchers 102 may also have different replacement schemes, i.e., different ways of deciding which entry 104 to replace when an allocation of an entry 104 is needed. Preferably, when the entry 104 is allocated, the counters 202/204/206/214 are reset and the current MAT 208, aggression level 212 and MAT bitmask 216 are initialized based on the MAT of the first memory access in the memory region.

The MYHIT counter 202 measures the number of hits to a cache line that was prefetched by the respective prefetcher 102, i.e., the prefetcher 102 with which the entry 104 is associated, e.g., for an entry 104 associated with prefetcher 0 102-0, a hit to a cache line that was prefetched by prefetcher 0 102-0. The OTHERHIT counter 206 measures the number of hits to a cache line that was prefetched by another prefetcher 102, i.e., a prefetcher 102 other than the prefetcher 102 with which the entry 104 is associated, e.g., for an entry 104 associated with prefetcher 0 102-0, a hit to a cache line that was prefetched by prefetcher 1 102-1. In an alternate embodiment, the OTHERHIT counter 206 measures the number of hits to a cache line that the instant prefetcher requested to prefetch, but was actually prefetched by another prefetcher 102, i.e., the request to prefetch the cache line by the instant prefetcher hit in the cache memory because it had already been prefetched by the other prefetcher 102. Preferably, each cache line includes bits of state (e.g., in the tag array of the cache memory) that enable determination of which prefetcher 102 prefetched the cache line. The NOTUSED counter 204 measures the number of cache lines prefetched by the associated prefetcher 102 that were never used, i.e., never accessed between the time they were prefetched and the time they were evicted from the cache.

The current MAT register 208 holds an identifier of the MAT currently characterizing the memory accesses associated with the entry 104. For example, with respect to Table 1 above, the MATs may have identifiers 0 through 31. Characterization of the memory accesses associated with the entry 104 is described below.

The aggression level register 212 holds information that specifies how aggressively the prefetcher 102 will prefetch. In one embodiment, the aggression level 212 specifies the prefetch count, i.e., the number of cache lines the prefetcher 102 will prefetch in response to a memory access when the prefetcher 102 decides to prefetch. For example, when the aggression level 212 is relatively low, the prefetch count may be 1, whereas when the aggression level 212 is relatively medium, the prefetch count may be 2, whereas when the aggression level 212 is relatively high, the prefetch count may be 3.

In another embodiment, the aggression level 212 specifies the maximum prefetch distance (e.g., in terms of cache lines) away from the current location to prefetch. For example, when the aggression level 212 is relatively low, the prefetch distance may be 5, whereas when the aggression level 212 is relatively medium, the prefetch distance may be 15, whereas when the aggression level 212 is relatively high, the prefetch distance may be 40. In another embodiment, the aggression level 212 specifies a combination of the prefetch count and prefetch distance. For example, the aggression level 212 may specify a prefetch count of 3, but in any event a prefetch distance of no greater than 30 cache lines; hence, if the stride was 17 cache lines, the prefetcher 102 would only prefetch two cache lines, rather than the prefetch count of 3.

In another embodiment, the aggression level 212 specifies how the prefetcher 102 prefetches based on current utilization of resources that are used by prefetch requests. An example of resource used by prefetch requests is a fill queue of the processor 102 that receives requests to fetch cache lines from memory. The amount of fullness of the fill queue (e.g., number of valid entries in the queue) may be provided to the prefetcher 102 as a measure of its current utilization. If the fill queue is very full with requests to fetch cache lines from memory demanded by the running program, then it might not be desirable to further burden the fill queue resource with requests to prefetch cache lines. For example, assume the fill queue currently only has three available entries (e.g., 13 of 16 entries in the fill queue are valid). In this case, if the aggression level 212 is below a first threshold, the prefetcher 102 may decide to refrain from generating any prefetches, whereas if the aggression level 212 is above the first threshold but below a second threshold, the prefetcher 102 may decide to generate one prefetch, whereas if the aggression level 212 is above the second threshold, the prefetcher 102 may decide to generate three prefetches. The former two choices might allow a program-demanded memory access to make forward progress since if it missed in the last level cache it would require an invalid fill queue entry to perform its allocation. However, the latter choice might prevent the demand memory access from making forward progress, yet the prefetcher 102 may have such a high score for a particular MAT that it is willing to take the risk. For example, the other fill queue entries may be associated with memory accesses that narrowly missed the window at which the prefetcher 102 is prefetching; however, the prefetcher 102 has now trained well on the access pattern and is ready to race ahead and prefetch well into the working data set of the program such that the program memory accesses begin to experience cache hits rather than misses. For another example, the prefetcher 102 may venture that the fill queue is primarily full of prefetch requests rather than demand memory accesses.

The MAT counters 214 preferably include a respective MAT counter 214 for each MAT. Each MAT counter 214 measures the number of memory accesses having the respective MAT since allocation of the associated entry 104. For example, if 14 store_fp MAT memory accesses have been made to the memory page associated with the entry 104 since it was allocated, the store_fp MAT counter 214 will have a value of 14. The MAT counters 214 may be used to characterize the current MAT 208 associated with an entry 104. Use of the MAT counters 214 is described in more detail below with respect to FIG. 9.

In another embodiment, the aggression level 212 specifies values of one or more parameters that govern behavior of the prefetcher 102 when encountering a memory access having a MAT that belongs to a group of MATs. In one embodiment, the prefetcher 102 recognizes N different groups (e.g., four) into which a MAT may be mapped. Each group includes a 32-bit register with a bit corresponding to each of the 32 MATs that indicates whether the MAT is included in the group associated with the register. In this way, each MAT may be dynamically assigned to a group. In one embodiment, each MAT is allowed to belong to only one group. It may be advantageous to group the MATs for the purpose of dynamically configuring the prefetcher 102, particularly with respect to the aggression level 212. Each group has a number of the parameters, which are initialized to default values that may be changed during operation, such as by microcode of the processor, system software (e.g., via model-specific registers (MSRs)), and or by other units or subprocessors, such as a service processor to the main processor. Examples of the parameters include the following, many of which are associated with the bounding box prefetcher referred to above: a parameter M used to define a region that should be prefetched into a cache memory of the processor, defined by [N, N+M], wherein N is a memory access location; a number of cache lines to prefetch into a lower level cache memory of the processor; a flag that controls whether to disable prefetches to immediately succeeding cache lines; a flag that controls the ability to begin to prefetch using only a single location to establish a starting point for a stream; respective flags that prevent the group from generating prefetches of different periods (e.g., 1, 3, 4, 5) and of periods other than 1, 3, 4, 5; a flag that controls the number of memory accesses required to lock onto a pattern; a flag that controls whether to lock onto a pattern if two memory accesses are one cache line apart; a flag that controls whether to lock onto a pattern if two memory accesses are greater than one cache line apart; a flag that controls whether to switch immediately from a pattern of greater than one to a pattern of one upon encountering two memory accesses one cache line apart; a flag that controls whether to ignore information that demand accesses are greater than the current period and consider only accesses less distant than a currently established pattern.

The MAT bitmask 216 preferably comprises a bitmask having a plurality of bits corresponding to the plurality of MATs. The control logic 222 sets one or more of the bits in the MAT bitmask 216 corresponding to one or more MATs that characterize memory accesses to the memory region associated with the entry 104, and the other bits in the MAT bitmask 216 remain clear. Use of the MAT bitmask 216 is described in more detail below with respect to FIG. 12.

The prefetch state 218 includes state other than the MAT-related counters 202/204/206/214 and registers 208/212/216 already described that the prefetcher 102 uses to make prefetch decisions. The prefetch state 218 may be different for the different prefetchers 102 depending upon the method used by each prefetcher 102 to prefetch, as described above. For example, the prefetch state 218 may include one or more prefetch stride length registers. The prefetch state 218 may also include a block number register, or memory address register, that holds the memory region address, e.g., of a physical memory page. The prefetch state 218 may also include a prefetch direction register. The prefetch state 218 may also include a block bitmask register that holds a bitmask used to indicate which cache lines within the memory region have been accessed. Each bit in the block bitmask corresponds to one cache line within the memory region. A true value of a bit in the block bitmask indicates that the corresponding cache line has been accessed. The block bitmask is initialized such that all bits are false. In one embodiment, the size of a memory block is 4 KB (which may in some instances equal the size of a physical memory page) and the size of a cache line is 64 bytes; thus, there are 64 bits in a block bitmask. However, the size of a cache line may vary in other embodiments. Furthermore, the size of the memory region over which the bitmask is maintained may vary and does not necessarily correspond to the size of a physical memory page. Rather, the size of the memory region, or block, over which the bitmask is maintained may be arbitrary (preferably a power of two), as long as it encompasses a sufficiently large number of cache lines to enable detection of a clear direction and pattern for beneficial prefetching purposes. The prefetch state 218 may also include a min pointer register and a max pointer register that are maintained to point to the lowest and highest cache line index, respectively, within the block that has been accessed since the prefetcher 102 began tracking accesses to this memory block. The prefetcher 102 may also include a min_change counter and a max_change counter that count the number of changes to the min pointer and the max pointer, respectively, since the prefetcher 102 began tracking accesses to this memory block. The prefetcher 102 may also include a total counter that counts the total number of cache lines accessed since the prefetcher 102 began tracking accesses to this memory block. The prefetcher 102 may also include a middle pointer that points to the middle cache line index (i.e., the average of the min pointer and max pointer) within the block that has been accessed since the prefetcher 102 began tracking accesses to this memory block. The prefetcher 102 may also include a direction register, a pattern register, a pattern period register, a pattern location register, and a search pointer register, which are used to detect access patterns used to prefetch. The prefetcher 102 may also include a plurality of period match counters. Each of the period match counters maintains a count for a different period. In one embodiment, the periods are 3, 4, and 5. The period is the number of bits to the left/right of the middle pointer. The period match counters are updated after each memory access to the block. If the block bitmask indicates that the accesses to the left of the middle pointer over the period match the accesses to the right of the middle pointer over the period, then the prefetcher 102 increments the period match counter associated with the period. The operation and use of the period match counters, direction register, pattern register, pattern period register, pattern location register, and search pointer register are described in more detail, according to one embodiment, with respect to the bounding box prefetcher of U.S. Pat. Nos. 8,645,631, 8,719,510, 8,762,649, and 8,880, 807.

Figure 3:
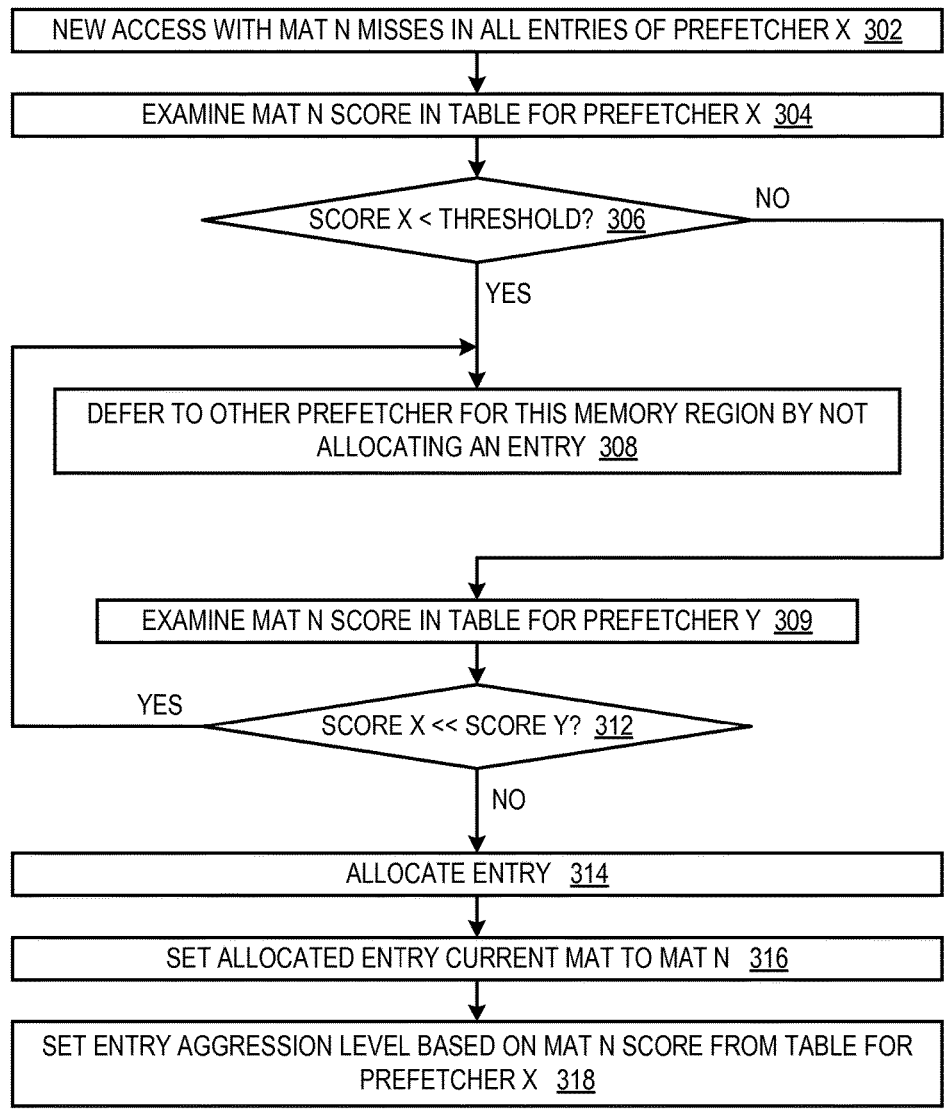
FIGS. 3 through 11 are flowcharts illustrating operation of the processor of FIG. 1.

Referring now to FIG. 3, a flowchart illustrating operation of the processor 100 is shown. Flow begins at block 302.

At block 302, a new memory access misses in all entries 104 of one of the prefetchers 102, referred to in FIG. 3 as prefetcher X. For example, the memory access is within a memory region that is not currently active within prefetcher X, e.g., for which an entry 104 has not been allocated. The memory access has an associated MAT. Flow proceeds to block 304.

At block 304, prefetcher X examines the score associated with the memory access's MAT in prefetcher X's table 106, referred to in FIG. 3 as score X. Flow proceeds to decision block 306.

At decision block 306, prefetcher X determines whether score X (the score examined at block 304) is less than a threshold. If so, flow proceeds to block 308; otherwise, flow proceeds to block 309. The threshold may be selected to prevent prefetcher X from prefetching for a particular MAT (or at least, for a memory region whose first access has the MAT) if the effectiveness of prefetcher X to prefetch for the MAT is relatively poor.

At block 308, prefetcher X refrains from allocating an entry 104, which results in prefetcher X deferring to the other prefetcher 102 (prefetcher Y) to prefetch from the memory region. Refraining from allocating an entry 104 may avoid replacing a valid entry 104 and advantageously enable the non-replaced valid entry 104 to continue to effectively prefetch for its memory region. Flow ends at block 308. In one embodiment, prefetcher X defers to prefetcher Y on a per-memory access basis, rather than a per-memory region basis. That is, prefetcher X allocates an entry 104 on a miss, but each time prefetcher X encounters a new memory access (e.g., at block 402 of FIG. 4), prefetcher X examines the scores 108 for the MAT of the new memory access and makes a decision similar to the decision at block 306 (and/or at block 312) whether to prefetch or to instead defer to prefetcher Y. In another embodiment, prefetcher X defers to prefetcher Y on a per-memory access basis by not hitting in the entry 104 if the MAT of the new memory access does not match the one or more MATs that currently characterize the entry 104, such as indicated in the MAT bitmask 216, as described below with respect to FIG. 12. That is, embodiments are described with respect to FIG. 12 in which prefetcher X defers to prefetcher Y to prefetch from the memory region but more narrowly in the sense that it defers on a per-memory access basis, in particular with respect to whether the given memory access has a MAT that corresponds to one or more MATs that characterize the memory region of the entry 104.

At block 309, prefetcher X examines the score associated with the memory access's MAT in the table 106 of the other prefetcher 102, referred to in FIG. 3 as prefetcher Y, which score is referred to in FIG. 3 as score Y. Flow proceeds to decision block 312. In one embodiment, prefetcher X does not perform the operations at blocks 309 and 312.

At decision block 312, prefetcher X determines whether score X is less than score Y. If so, flow proceeds to block 308; otherwise, flow proceeds to block 314. The amount which score X must be less than score Y in order to refrain from allocating an entry 104 may be selected to prevent prefetcher X from prefetching for a particular MAT if the effectiveness of prefetcher X significantly worse than the effectiveness of prefetcher Y for the particular MAT. Thus, in one embodiment, a difference between score X and score Y is generated, and the difference must be greater than a threshold in order to proceed to block 308.

At block 314, prefetcher X allocates one of its entries 104. Flow proceeds to block 316.

At block 316, prefetcher X sets the current MAT register 208 of the allocated entry 104 to the MAT of the new memory access. Flow proceeds to block 318.

At block 318, prefetcher X sets aggression level register 212 of the allocated entry 104 based on score X. Flow ends at block 318.

Figure 4:
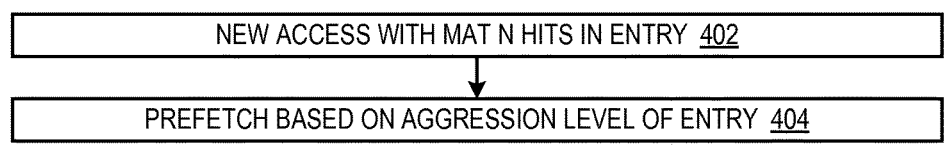

Referring now to FIG. 4, a flowchart illustrating operation of the processor 100 is shown. Flow begins at block 402.

At block 402, a new memory access hits in an entry 104 of one of the prefetchers 102. For example, the memory access is within a memory region that is currently active within the prefetcher 102, e.g., for which an entry 104 has been allocated. The memory access has an associated MAT. Flow proceeds to block 404.

At block 404, the prefetcher 102 prefetches based on the current aggression level 212. The current aggression level 212 may be set in various manners described herein, such as at block 318 of FIG. 3, block 912 of FIG. 9, or blocks 1018 and 1019 of FIG. 10. Flow ends at block 404.

In one embodiment, for each new memory access that hits in an entry 104, the prefetcher 102 updates the current MAT 108 to the MAT of the new memory access and updates the current aggression level 212 to the score 108 from the table 106 associated with the MAT of the new memory access, if necessary, and prefetches based on the current aggression level 212. In one embodiment, the control logic 222 copies the scores 108 from the column of the table 106 associated with the prefetcher 102 to local storage within the entry 104 upon allocation of the entry 104.

Figure 5:
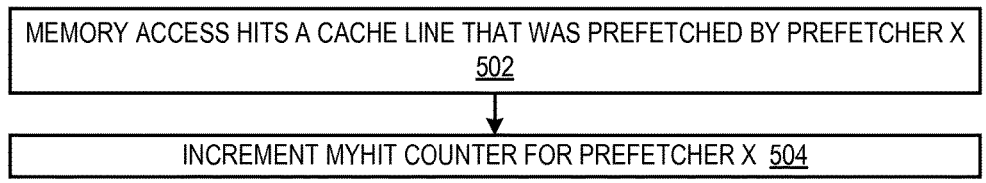

Referring now to FIG. 5, a flowchart illustrating operation of the processor 100 is shown. Flow begins at block 502.

At block 502, one of the prefetchers 102, referred to in FIG. 5 as prefetcher X, detects that a memory access hits in a cache line that was prefetched by prefetcher X. As described above, the tag array of the cache memory (e.g., LLC) may include bits that facilitate determination of which of the prefetchers 102, if any, prefetched the cache line. Flow proceeds to block 504.

At block 504, the MYHIT counter 202 of the relevant entry 104 of prefetcher X is incremented. Flow ends at block 504.

Figure 6:
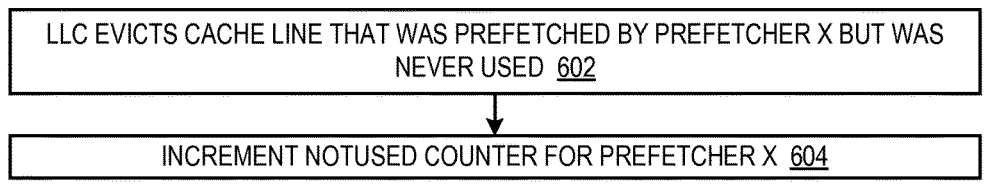

Referring now to FIG. 6, a flowchart illustrating operation of the processor 100 is shown. Flow begins at block 602.

At block 602, one of the prefetchers 102, referred to in FIG. 6 as prefetcher X, detects that a cache line is being evicted from the cache memory (e.g., LLC) that was prefetched into the cache memory by prefetcher X, but was never used between the time it was prefetched and the time is was evicted from the cache memory. The tag array of the cache memory (e.g., LLC) may include bits that facilitate determination of whether the cache line was accessed or not. Flow proceeds to block 604.

At block 604, the NOTUSED counter 204 for prefetcher X is incremented. Flow ends at block 604.

Figure 7:
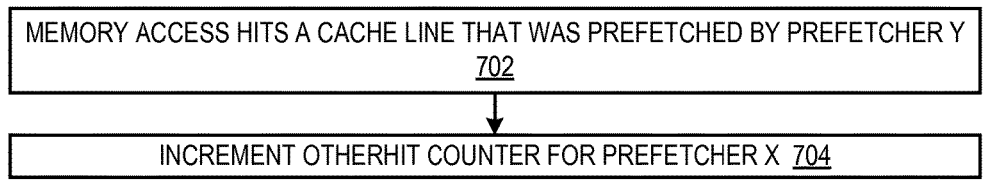

Referring now to FIG. 7, a flowchart illustrating operation of the processor 100 is shown. Flow begins at block 702.

At block 702, one of the prefetchers 102, referred to in FIG. 7 as prefetcher X, detects that a memory access hits in a cache line that was prefetched by the other prefetcher 102, referred to in FIG. 7 as prefetcher Y. Alternatively, as described above, prefetcher X detects that memory access hits in a cache line that prefetcher X requested to prefetch, but was actually prefetched by prefetcher Y. Flow proceeds to block 704.

At block 704, the OTHERHIT counter 206 of the relevant entry 104 of prefetcher X is incremented. Flow ends at block 704.

Figure 8:
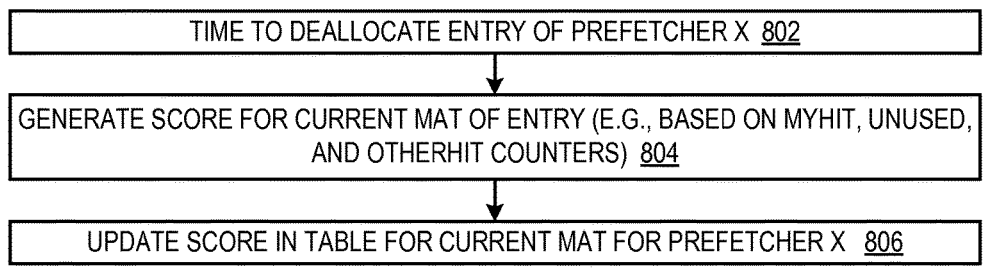

Referring now to FIG. 8, a flowchart illustrating operation of the processor 100 is shown. Flow begins at block 802.

At block 802, one of the prefetchers 102, referred to in FIG. 8 as prefetcher X, detects that it is time to de-allocate an entry 104. For example, prefetcher X may need to allocate the entry to another memory region. Or, prefetcher X may determine that the program is no longer accessing the memory region and/or that prefetcher X is no longer effectively prefetching from the memory region. Flow proceeds to block 804.

At block 804, prefetcher X generates a score 108 for the current MAT 208 of the entry 104. Preferably, prefetcher X generates the score 108 based on the MYHIT counter 202, the NOTUSED counter 204 and the OTHERHIT counter 206. In one embodiment, the control logic 222 calculates the score as a weighted sum of two or more inputs, such as the values of the MYHIT counter 202, the NOTUSED counter 204 and the OTHERHIT counter 206. Preferably, the weight associated with the MYHIT counter 202 is positive, whereas the weights associated with the NOTUSED counter 204 and the OTHERHIT counter 206 are negative. Flow proceeds to block 806.

At block 806, the prefetcher 102 updates the current MAT 208 score 108 in the table 106 for prefetcher X with the score 108 calculated at block 804. In one embodiment, the prefetcher 102 updates, for each MAT whose MAT counter 214 is non-zero, the MAT score 108 in the table 106 for prefetcher X with the score 108 calculated at block 804. In one embodiment, the prefetcher 102 updates, for each MAT whose MAT counter 214 is greater than a threshold, the MAT score 108 in the table 106 for prefetcher X with the score 108 calculated at block 804. Flow ends at block 806.

Figure 9:
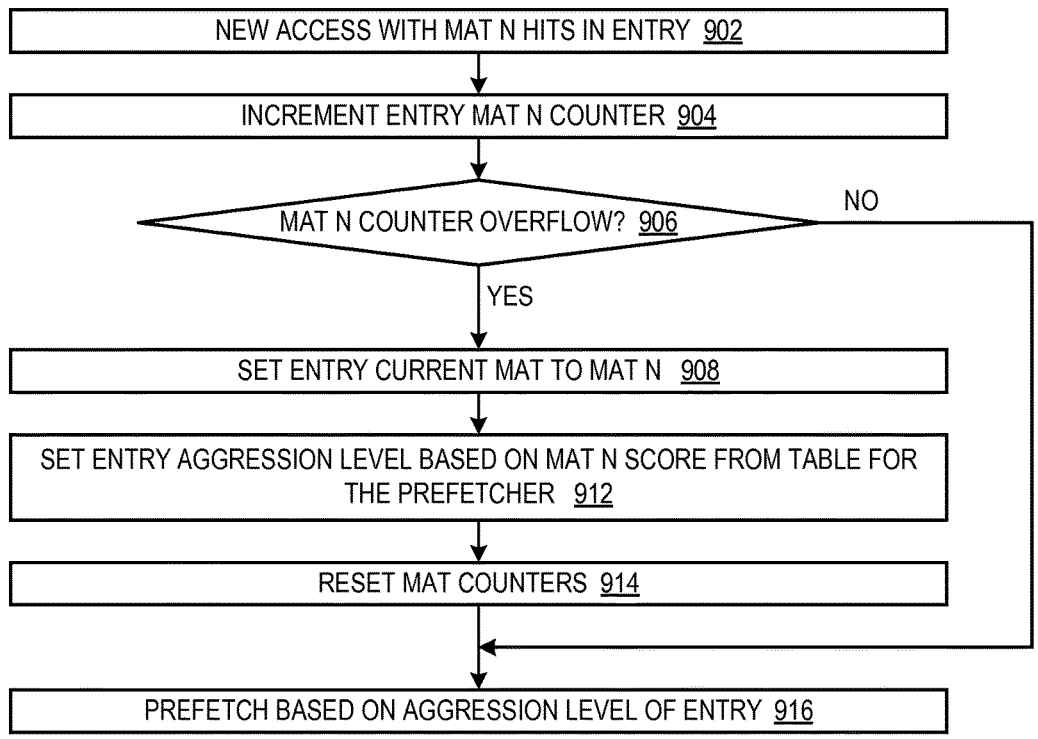

Referring now to FIG. 9, a flowchart illustrating operation of the processor 100 is shown. Flow begins at block 902.

At block 902, a new memory access hits in an entry 104 of one of the prefetchers 102. For example, the memory access is within a memory region that is currently active within the prefetcher 102, e.g., for which an entry 104 has been allocated. The memory access has an associated MAT. Flow proceeds to block 904.

At block 904, the control logic 222 increments the MAT counter 214 associated with the MAT of the new memory access. Flow proceeds to decision block 906.

At decision block 906, the control logic 222 determines whether the MAT counter 214 incremented at block 904 has reached a threshold. If so, flow proceeds to block 908; otherwise, flow proceeds to block 916. The threshold indicates that the MAT associated with the MAT counter 214 has become the predominant MAT for the memory accesses in the memory region.

At block 908, the control logic 222 sets the current MAT 208 of the entry 104 to the MAT of the new memory access, which is also the MAT associated with the MAT counter 214 that overflowed. Flow proceeds to block 912.

At block 912, the control logic 222 sets aggression level register 212 of the allocated entry 104 based on the score 108 associated with the MAT and the prefetcher 102. Flow proceeds to block 914.

At block 914, the control logic 222 resets the MAT counters 214. Flow proceeds to block 916.

At block 916, the prefetcher 102 prefetches based on the current aggression level 212. Flow ends at block 916.

Figure 10:
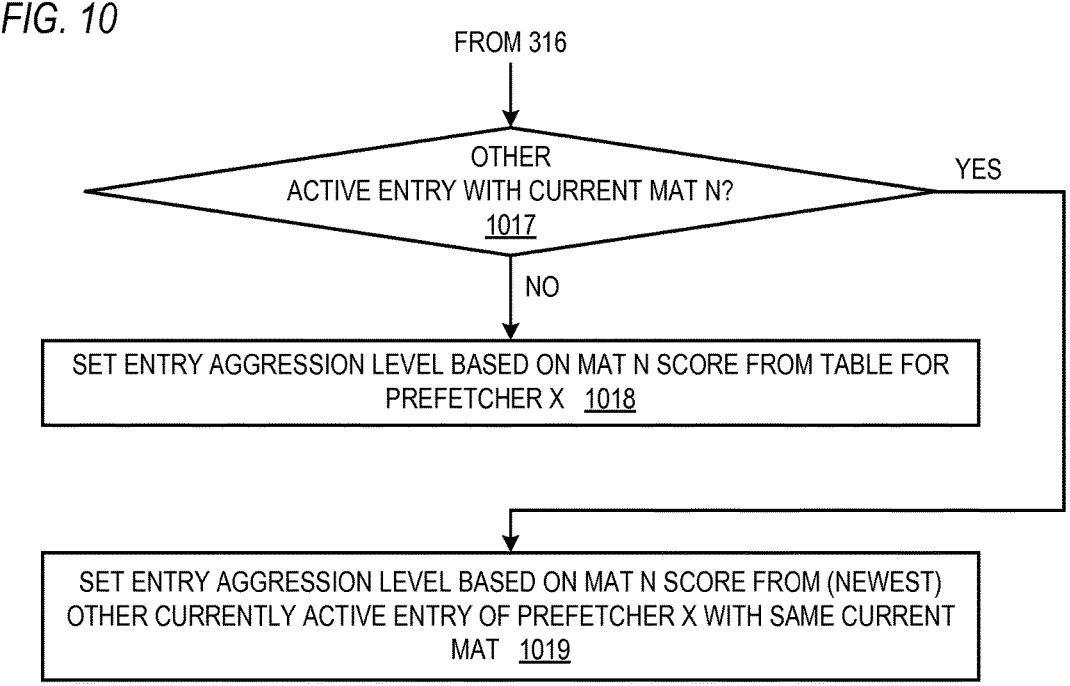

Referring now to FIG. 10, a flowchart illustrating operation of the processor 100 is shown. FIG. 10 describes an alternate embodiment to FIG. 3. In the embodiment of FIG. 10, rather than waiting to generate a score for the current MAT 208 as at block 804 of FIG. 8 until de-allocation time of the entry 104, the control logic 222 continually generates a score for the current MAT 208 (e.g., each time one of the counters 202/204/206 is updated). The continuously generated score is used at block 1019 of FIG. 10 (described below) to update the score 108 in the table 106. In FIG. 10, flow proceeds from block 316 of FIG. 3 to decision block 10017 of FIG. 10.

At decision block 1017, prefetcher X identifies whether there are any other valid entries 104 of prefetcher X that have the same current MAT 208 as the MAT of the new memory access. If so, flow proceeds to block 1019; otherwise, flow proceeds to block 1018. In one embodiment, if there are multiple other valid entries 104 of prefetcher X that have the same current MAT 208, prefetcher X identifies the newest (i.e., most recently allocated) of the matching entries 104.

At block 1018, prefetcher X sets aggression level register 212 of the allocated entry 104 based on score X. Flow ends at block 1018.

At block 1019, prefetcher X sets the aggression level register 212 of the allocated entry 104 based on the continuously generated score of the other valid entry 104 identified at decision block 1017. Flow ends at block 1019.

As may be observed, the embodiments of FIGS. 9 and 10 provide ways of setting the current MAT 208 for an entry 104 to characterize the memory region that are alternate to characterizing based on the first memory access to the memory region or characterizing for each individual memory access, such as described above with respect to FIG. 4.

Figure 11:
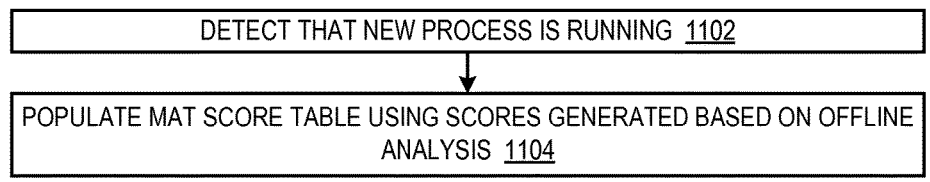

Referring now to FIG. 11, a flowchart illustrating operation of the processor 100 is shown. Flow begins at block 1102.

At block 1102, the system that comprises the processor 100 detects that a new process, or program, is running. In one embodiment, system software running on the processor 100 detects the new process, e.g., a device driver monitors the operating system process table. The system software may provide information to the processor that may be used by the processor to detect that the program has entered each of different phases, such as described below with respect to FIG. 13, and the system software may specify different MAT scores for each of the phases. In response to the instruction, the processor updates the MAT scores 108 and, if provided, loads the phase detectors (1414 of FIG. 13) with the initial phase identifiers (1412 of FIG. 13). In one embodiment, the processor 100 itself detects the new process, e.g., the processor 100 detects a change in a process context identifier (PCID), e.g., that a new value has been loaded into the PCID portion of the x86 instruction set architecture CR3 register. In one embodiment, the processor 100 detects a transition to a new phase of the currently running program, rather than a program change. Flow proceeds to block 1104.

At block 1104, the prefetcher 102 populates the MAT score table 106 with scores that were previously generated based on offline analysis of the process that was detected at block 1102. In one embodiment, the system software provides the scores when it detects the new process is running at block 1102. In one embodiment, the processor 100 fetches the scores from a memory (e.g., local private memory of the processor 100 or system memory) in response to detecting the PCID change or program phase transition; preferably, the processor 100 identifies the scores from a list using the PCID or phase identifier. The score information may include different scores for different phases of the program also determined by offline analysis. Flow ends at block 1104.

Figure 12:
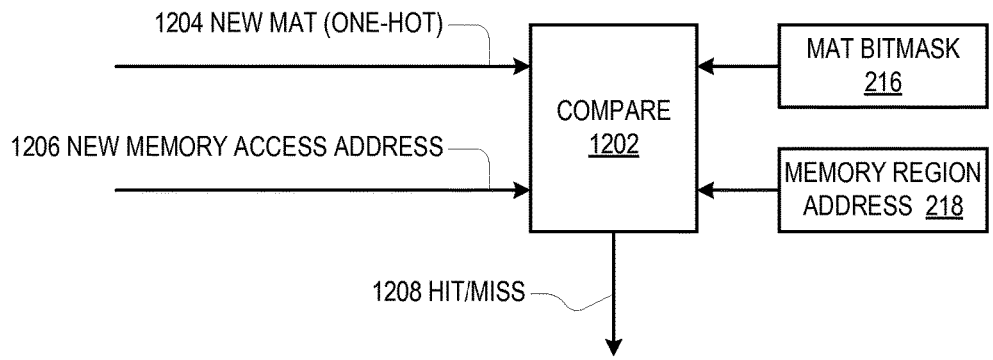
FIG. 12 is a block diagram illustrating the entry of FIG. 1 according to an alternate embodiment.

Referring now to FIG. 12, a block diagram illustrating the entry 104 of FIG. 1 according to an alternate embodiment is shown. In the embodiment of FIG. 2, the control logic 222 compares the address of a new memory access with the memory region address held in a memory region address register of the prefetcher state 218 to determine whether the new memory access hits or misses in the entry 104. That is, an entry 104 hit is based simply on the memory address. However, the embodiment of FIG. 12 qualifies an entry 104 hit using the MAT of the current memory access as described herein.

The entry 104 of the embodiment of FIG. 12 includes a comparator 1202 that receives the MAT bitmask 216 and a memory region address 218, which is part of the prefetcher state 218 of FIG. 2. The comparator 1202 compares the MAT bitmask 216 and memory region address 218 with the new MAT 1204 (i.e., the MAT of the new memory access in the form of a decoded one-hot bit vector) and the new memory access address 1206. If the addresses 218/1206 match and the bit in the MAT bitmask 216 corresponding to the new MAT bit 1204 is set, the comparator 1202 indicates a hit and otherwise indicates a miss on a hit/miss indicator 1208, e.g., at blocks 302, 402 and 902 of FIGS. 3, 4 and 9, respectively.

As described above, the embodiment of FIG. 12 selectively partitions the entry 104 resources based not only on memory address, but also on MAT. Consequently, the same memory region could have multiple entries 104 allocated to it such that each entry 104 is prefetching for a different one or more characterized MATs. That is, the prefetcher 102 selectively generates prefetches in response to a new memory access using the aggression level 212 of the entry 104 associated with the MAT of the new memory access. This may be particularly effective for memory regions in which the memory accesses to the region vary widely in their ability to be effectively prefetched by the prefetcher 102.

Preferably, the control logic 222 populates the MAT bitmask 216 when it allocates the entry 104. In one embodiment, the control logic 222 sets the bit in the MAT bitmask 216 corresponding to the MAT of the new memory access in response to which the entry 104 was allocated. In one embodiment, the control logic 222 dynamically updates the MAT bitmask 216 as the prefetcher 102 prefetches in the memory region, as described in more detail below.

In one embodiment, the control logic 222 sets the bits in the MAT bitmask 216 corresponding to a group of MATs that includes the MAT of the new memory access. For example, one group may include MATs that involve floating point operations (e.g., fp_load, fp_store, fused_fp_store in Table 1 above); another group may include MATs that involve fused operations (e.g., fused_fp_store, fused_load, fused_store, fused_store_aps, fused_store_update); another group may include MATs that involve load operations (e.g., fp_load, fused_load, load, load_aps, load_descr, load_nac, load_nt, load_store, load_supervisor, load_zx); another group may include MATs that involve store operations (e.g., fp_store, fused_fp_store, fused_store, fused_store_aps, fused_store_update, store, store_aps, store_mask, store_nt, store_nt_aps, store_push, store_supervisor, store_update, store_update_nac); another group may include MATs that involve media operations (e.g., load_aps, store_aps, store_nt_aps); another group may include MATs that involve non-temporal access operations (e.g., load_nt, pf_nt, store_mask, store_nt, store_nt_aps); another group may include MATs that involve address-modifying operations (e.g., fused_store_update, store_update, store_update_nac); another group may include MATs that involve no alignment checking operations (e.g., load_nac, store_update_nac); another group may include MATs that involve prefetch operations (e.g., boxpf, gpf, 11 dpf, pf_11d, pf_s2, pf_nt, pf_w); and another group may include MATs that involve stack operations (e.g., fused_store_update, store_push, store_update, store_update_nac). In one embodiment, rather than holding scores 108 for individual MATs, the MAT score table 106 holds scores 108 for MAT groups, and the prefetcher 102 operates based on MAT groups rather than individual MATs.

In one embodiment, a prefetcher 102 limits the number of entries 104 that it allocates for the same memory region. For example, when the prefetcher 102 detects that two entries 104 (or other predetermined threshold, e.g., half the entries 104) are currently allocated for the same memory region, rather than allocate another entry 104 for the memory region, the prefetcher 102 joins the MAT (or alternatively a group that includes the MAT) with an already-allocated entry 104 by setting the bit associated with the new memory access MAT in the MAT bitmask 216 of the already-allocated entry 104, or by setting bits associated with a group of MATs that includes the new memory access MAT. As a result, subsequent memory accesses of the new MAT to the memory region will hit in the entry 104. In this manner, the prefetcher 102 may avoid a memory region consuming too large a percentage of the entries 104, and yet may advantageously segment the memory region according to different MATs and/or MAT groups.

In one embodiment, the MATs are each placed into one of a plurality of mutually exclusive groups (e.g., four groups, and each MAT of Table 1 above is placed into one and only one of the four groups). Each of the groups has an associated level of prefetch aggressiveness. Each time the prefetcher 102 encounters a new memory access, it prefetches based on the level of aggressiveness associated with the group in which the MAT of the new memory access belongs. For example, assume the fp_store MAT has been placed into a group that has a prefetch count of three and the prefetcher 102 encounters a new memory access with a MAT of fp_store. In that case, the prefetcher 102 will prefetch the next three cache lines according to the prevailing access pattern within the memory region determined by the prefetcher 102. Similar to manners described herein, the levels of aggressiveness associated with the groups may be dynamically adjusted as the prefetcher 102 operates.

Figure 13:
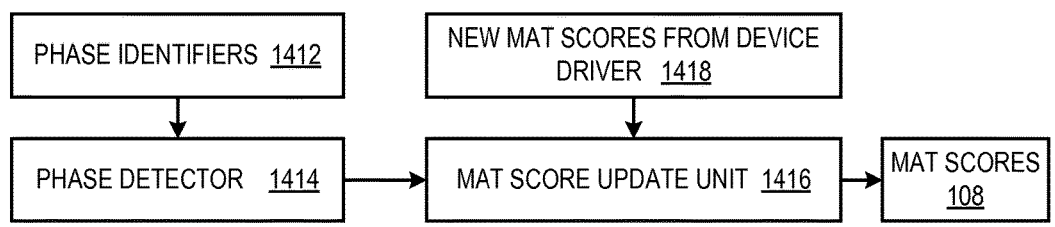
FIG. 13 is a block diagram illustrating elements of the processor that includes the prefetchers of FIG. 1.

Referring now to FIG. 13, a block diagram illustrating elements of the processor that includes the prefetchers 102 of FIG. 1 is shown. The processor includes a phase detector 1414 that detects the running program has entered a new phase. The phase detector 1414 makes the determination based on phase identifiers 1412 provided to it, such as by a device driver as described above with respect to FIG. 11. The phase identifiers 1412 may include an instruction pointer (or program counter) value of an instruction of the program. The instruction may be a subroutine call instruction, in which case the phase identifiers 1412 may also include an instruction pointer (or program counter) value of the target instruction of the call instruction. Furthermore, the phase identifiers 1412 may also include one or more parameter values of the call instruction, e.g., return address, register values and/or stack values. One example of a phase detector, which is referred to therein as a fingerprint unit, is described in more detail in U.S. patent application Ser. Nos. 14/050,687 and 14/050,757, both filed on Oct. 10, 2013, both of which claim priority to U.S. Provisional Application No. 61/880,620, filed on Sep. 20, 2013, each of which is hereby incorporated by reference in its entirety for all purposes. The processor also includes a MAT score update unit 1416 that is notified by the phase detector 1414 that a new phase has been detected and receives an identifier of the new phase. The MAT score update unit 1416 also receives the MAT scores, e.g., from the device driver as described above with respect to FIG. 11. The MAT score update unit 1416 updates the MAT scores 108, as described below with respect to FIG. 14. In one embodiment, the MAT score update unit 1416 comprises microcode of the processor that is invoked by the phase detector 1414. In an alternate embodiment, the MAT score update unit 1416 comprises a state machine that receives an indicator from the phase detector 1414 that a new phase has been detected and the identifier of the new phase. Phase analysis is described in more detail with respect to FIG. 17 below.

Figure 14:
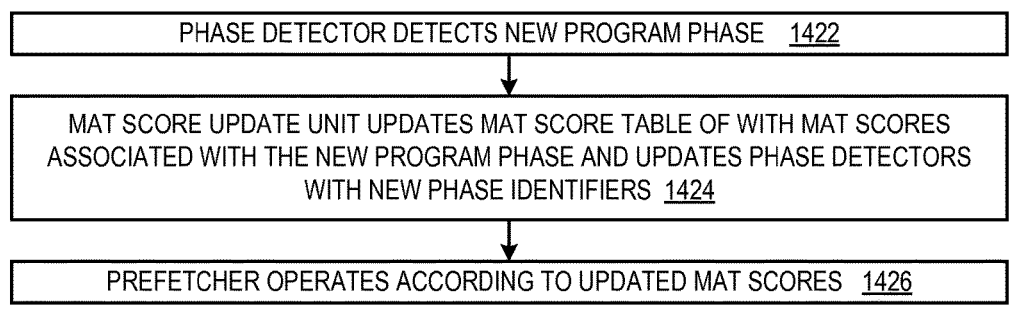
FIG. 14 is a flowchart illustrating operation of the processor of FIG. 13 that includes the prefetchers of FIG. 1.

Referring now to FIG. 14, a flowchart illustrating operation of the processor of FIG. 13 that includes the prefetchers 102 of FIG. 1 is shown. Flow begins at block 1422.

At block 1422, the phase detector 1414 of FIG. 13 detects the running program has entered a new phase. In response to detecting the new phase, the phase detector 1414 notifies the MAT score update unit 1416 of FIG. 13. Flow proceeds to block 1424.

At block 1424, the MAT score update unit 1416 looks up the identifier of the new phase received from the phase detector 1414 in the MAT scores 1418 (e.g., received from the device driver at block 1404 of FIG. 11) and updates the MAT score table 106 with the MAT scores found in the lookup. Additionally, the MAT score update unit 1416 updates the phase detectors 1414 with new phase identifiers 1412, as necessary. In one embodiment, the phases to be looked for next depend upon the current phase; hence, the phase identifiers 1412 to be loaded into the phase detector 1414 may be different depending upon the current phase. Flow proceeds to block 1426.

At block 1426, the processor executes the running program and the prefetchers 102 perform prefetches according to the updated MAT scores 108 as performed at block 1424. Flow ends at block 1426.

The configuration of a prefetcher in the various manners described herein, such as with respect to prefetcher aggressiveness based on MAT scores may be either by static configuration, by dynamic configuration or both. Generally speaking, the static configuration is pre-silicon. That is, the designers employ intuition, preferably aided by software simulation of the processor design, to determine good configurations, that is, configurations that potentially improve the performance of the processor in general, and of the prefetcher in particular. Improving performance of the processor is improving the speed at which the processor executes the program (e.g., reduces the clocks per instruction rate or increases the instructions per clock rate) and/or reduces the power consumption. The programs may be operating systems, executable programs (e.g., applications, utilities, benchmarks), dynamic link libraries, and the like. The software simulation may be employed to perform offline analysis of the execution of programs for which it is desirable to improve performance of the processor, as described below with respect to FIGS. 15 through 17 for example, particularly with respect to prefetcher configuration. Preferably, the designers determine a static configuration that tends to be good over the set of programs at large. The designers then include the good static configuration into the design that is manufactured into silicon.

In contrast, the analysis to determine dynamic configuration is performed post-silicon, generally speaking. That is, after the processor is manufactured, the designers perform offline analysis of a different kind to determine how the processor performs when executing the programs with configurations different than the static, or default, configuration manufactured into silicon. The post-silicon testing may involve a more rigorous, perhaps more brute force, technique in which automated performance regression against a configuration matrix is performed, and then the regression performance data is analyzed, as described below with respect to FIG. 18, for example. The designer may employ the results of the pre-silicon testing for the population of programs as initial seeds to the post-silicon testing, e.g., to attempt to avoid local maxima that are not the global maxima.

Regardless of whether the testing is pre-silicon or post-silicon, with the dynamic configuration testing, good configurations are determined on a per-program basis, or even on a per-program phase basis. Then, when the system, e.g., a device driver, detects a known program is running on the processor (i.e., a program for which the analysis has been performed and a good configuration is known), the system provides the good program-specific configuration to the processor, and the processor updates the prefetcher with the program-specific configuration in a dynamic fashion while the processor is running. Preferably, the program-specific configuration includes different configurations for different phases of the program, and the processor detects the phase changes and dynamically updates the configuration in response with the phase-specific configuration, as described with respect to FIG. 17, for example.

A program phase, with respect to a given set of characteristics, is a subset of a computer program characterized by a consistent behavior among those characteristics. For example, assume the relevant characteristics are branch prediction rate and cache hit rate, a phase of a program is a subset of the runtime behavior of the program in which the branch prediction rate and cache hit rate are consistent. For instance, offline analysis may determine that a particular data compression program has two phases: a dictionary construction phase and a dictionary lookup phase. The dictionary construction phase has a relatively low branch prediction rate and a relatively high cache hit rate, consistent with building a set of substrings common to a larger set of strings; whereas, the dictionary lookup phase has a relatively high branch prediction rate and a relatively low cache hit rate, consistent with looking up substrings in a dictionary larger than the size of the cache. Offline analysis may determine similar trends with respect to prefetcher effectiveness, which may be used to identify program phases for configuring a prefetcher, e.g., updating its MAT scores 108.

In one embodiment, offline analysis is performed using the notion of an "oracle cache," which, as its name implies, knows the future. Given the limited amount of space in the cache memory, the oracle cache knows the most useful data that should be in the cache at any point in time. It may be conceptualized as a cycle-by-cycle or instruction-by-instruction snapshot of the contents of the cache that would produce the highest hit ratio.

Figure 19:
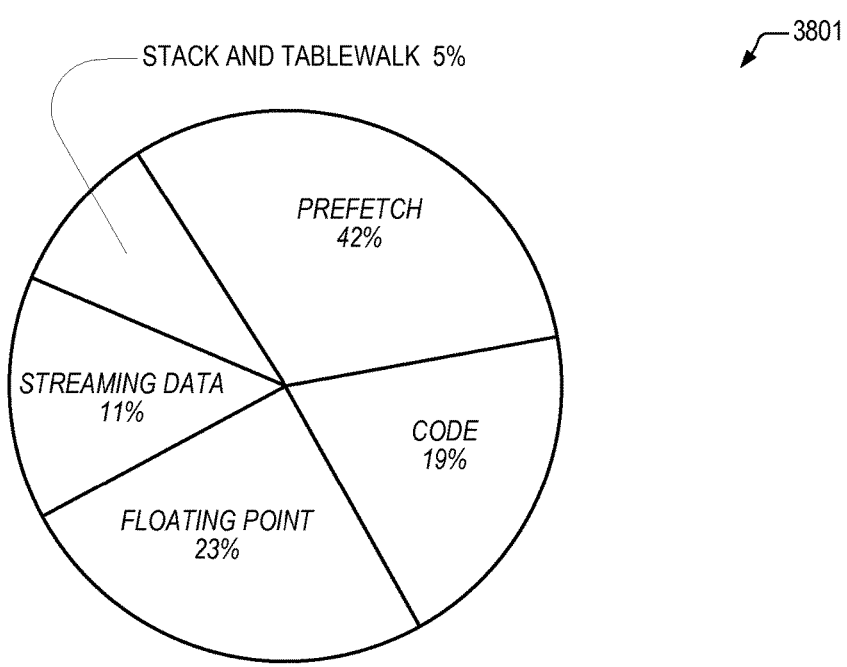
FIG. 19 is a pie chart illustrating analysis results.

First, one generates the sequence of oracle cache snapshots for a program execution and keeps track of the MAT of the memory access that produced the allocation of each cache line in the snapshots. Then, one produces a pie chart for each snapshot that shows, for each MAT or group of MATs, the percentage of the cache occupied by a cache line that was allocated in response to a memory access of the MAT, an example of which is shown in FIG. 19. Then, on a subsequent execution instance of the program, the processor continually updates the MAT scores of the prefetcher based on the MAT percentages from the sequence of pie charts.

When it is impractical to update the MAT scores on the granularity of a clock cycle or instruction, one examines the pie chart sequences for tendencies over much longer time durations, e.g., an entire program or program phase. One takes the average of all the pie charts in the sequence (of the program or phase) for each MAT and makes the average pie chart the budget.

Broadly speaking, the idea of the oracle cache is that, because it knows all of the memory accesses in advance, it can pre-execute all of the memory accesses. Then as the program executes, the oracle cache predicts the best set of cache lines to be in the cache at any given point in time. For instance, in the graph of FIG. 16, the oracle cache would predict that the short duration cache line of MAT 1 (the line second from the top depicted with a solid line) should not be cached after its last access. Using such analysis, observations are derived about data prefetching on a per MAT basis.

Figure 15:
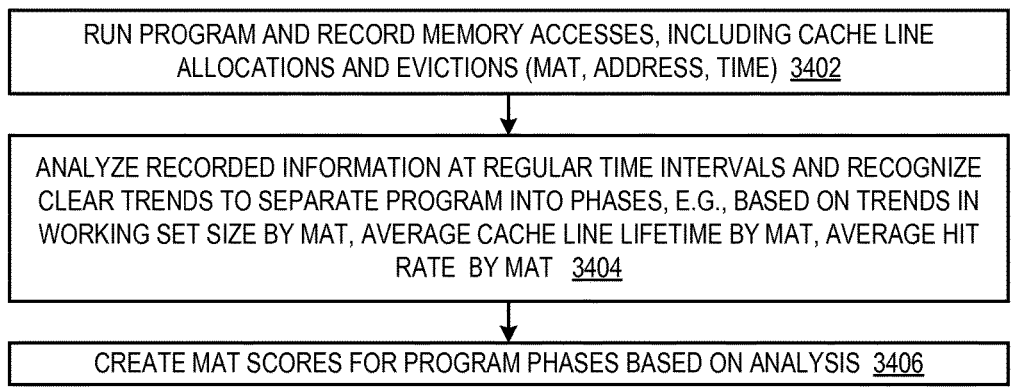
FIG. 15 is a flowchart illustrating generation of configurations, e.g., MAT scores, for programs and program phases.

Referring now to FIG. 15, a flowchart illustrating generation of configurations, e.g., MAT scores, for programs and program phases is shown. Flow begins at block 3402.

At block 3402, the designer, preferably in an automated fashion, runs a program and records memory accesses 134 to the cache memory 132 made by the program. Preferably, the allocations, hits and evictions of cache lines are recoded. The memory address, MAT and time (e.g., relative clock cycle) of the memory accesses 134 are recorded. Flow proceeds to block 3404.

At block 3404, the designer, preferably in an automated fashion, analyzes the information recorded at block 3402 at regular time intervals and recognizes clear trends to separate the program into phases, e.g., as described below with respect to FIG. 17. For example, clear trends in working set size by MAT, average cache line lifetime by MAT, average hit rate by MAT may be recognized. Flow proceeds to block 3406.

At block 3406, the designer, preferably in an automated fashion, creates configurations for the different program phases based on the analysis performed at block 3404. For example, the configurations may be prefetch aggressiveness MAT scores, e.g., 108 of FIG. 1. In one embodiment, the analysis to determine the configurations may include analysis similar that described below with respect to FIGS. 16 through 19. It should be understood that some programs might not exhibit clear trends such that they are susceptible to being broken down into distinct phases, in which case a single configuration may suffice for the entire program. Flow ends at block 3406.

Figure 16:
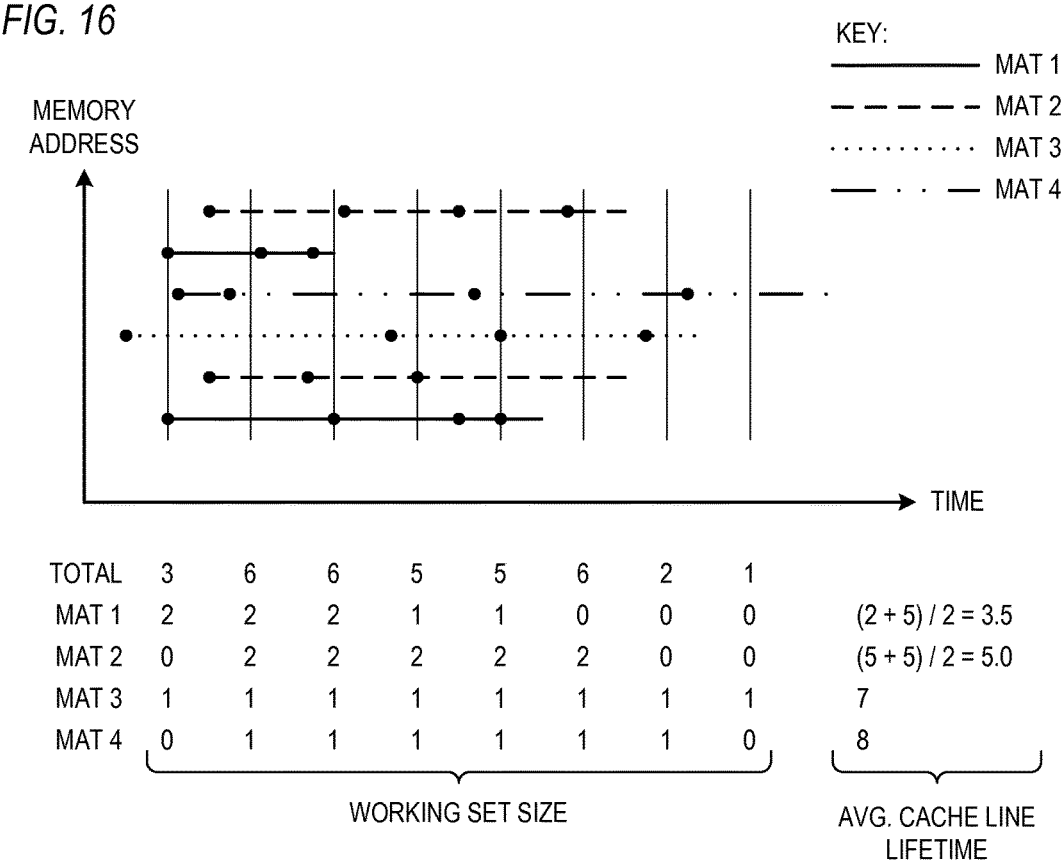
FIG. 16 is a memory access graph and extracted data from the graph.

Referring now to FIG. 16, a memory access graph and extracted data from the graph is shown. The graph plots memory accesses, indicated by dots, in which time is the independent variable shown on the horizontal axis, and memory address is the dependent variable shown on the vertical axis. Horizontal lines correspond to individual cache line at the specified memory address. The left edge of the line signifies the allocation of the cache line, and the right edge of the line signifies the eviction of the cache line from the cache memory. Each cache line has an associated MAT, which in the example of FIG. 16 are denoted MAT 1, MAT 2, MAT 3 and MAT 4. In the example of FIG. 16, six cache lines are illustrated in which two have associated MAT 1, two have associated MAT 2, one has associated MAT 3 and one has associated MAT 4.

Below the graph is shown, at each of eight different regular time intervals, the total working set size and working set size for each respective MAT. The time intervals may be correlated to basic block transfers as described below with respect to FIG. 17, for example, and used to determine program phases and configurations for each of the program phases. For example, during a particular program or phase, the configuration may budget more ways, set groups, chunks, or parcels to MATs with relatively larger working set sizes and budget fewer ways to MATs with relatively smaller working set sizes, or at least take working set size into consideration, which is shown for each MAT in FIG. 16.

Additionally, observations may be made about how long cache lines per individual MAT tend to be useful, such as average cache line lifetime. The average cache line lifetime is calculated as the sum of the lifetime (from allocation to eviction) of all the cache lines of the respective MAT over the phase divided by the number of cache lines of the MAT. This information can be used to influence the prefetch policy.

If the oracle cache constrains the number of cached lines to correspond to the intended number of sets and ways that are included in the cache memory, the accuracy of the prefetch policy and average lifetime observations may increase. Other indicators may also be gathered, such as cache line hits per MAT.

Figure 17:
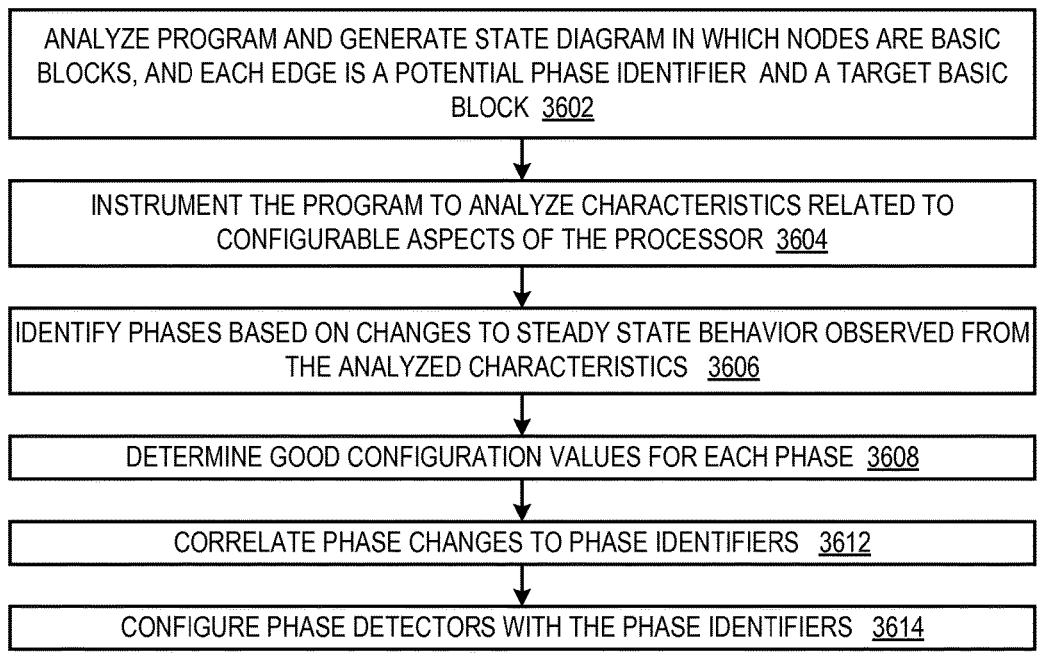
FIG. 17 is a flowchart illustrating phase analysis of a program.

Referring now to FIG. 17, a flowchart illustrating phase analysis of a program is shown. The phase analysis is a form of offline analysis that may be used to determine good configurations of configurable aspects of the processor, such as its cache memory or prefetchers. Flow begins at block 3602.

At block 3602, a program for which it is desirable to improve performance by the processor when executing the program is analyzed and broken down to generate state diagrams. The nodes of the state diagram are basic blocks of the program. Basic blocks are sequences of instructions between program control instructions (e.g., branches, jumps, calls, returns, etc.). Each edge in the stage diagram is a target basic block to which the edge leads and state change information, which may become a phase identifier, as described more below. A phase identifier may include the instruction pointer (IP), or program counter (PC), of a control transfer instruction, a target address of the control transfer instruction, and/or the call stack of a control transfer instruction. The call stack may include the return address and parameters of the call. The program phases are portions of the programs that comprise one or more basic blocks. Flow proceeds to block 3604.

At block 3604, the program is instrumented to analyze characteristics related to configurable aspects of the processor such as prefetcher MAT scores. Examples of the characteristics include cache hit rate, branch prediction accuracy, working set size, average cache line lifetime, and cache pollution (e.g., the number of cache lines prefetched but never used). Flow proceeds to block 3606.

At block 3606, the program is executed with a given configuration, e.g., of cache memory and/or prefetcher, and phases of the program are identified by observing steady state behavior in the analyzed characteristics of block 3604. For example, assume cache hit rate is the analyzed characteristic of interest, and assume the cache hit rate changes from 97% to 40%. The cache hit rate change tends to indicate that the prefetcher configuration was good for the program prior to the change and not good for the program after the change. Thus, the sequence of basic blocks prior to the cache hit rate change may be identified as one phase and the sequence of basic blocks after the cache hit rate change may be identified as a second phase. For another example, assume working set size of different MATs is the analyzed characteristic of interest, then significantly large shifts in working set sizes for the different MATs, or MAT groups, may signal a desirable location in the program to identify a phase change. Flow proceeds to block 3608.

At block 3608, once the phases are identified, good configurations are determined for each phase. For example, various offline analysis techniques may be used, such as the method described above with respect to FIGS. 15 and 16 or below with respect to FIG. 18. Flow proceeds to block 3612.

At block 3612, phase identifiers are correlated to the phase changes. The state change information, or potential phase identifiers, of the basic block transition described above at which a change in the analyzed characteristic occurred are recorded along with the good configuration values determined at block 3608 for the program so the information may be provided to the processor when it is detected, e.g., by a device driver, that the analyzed program is about to run. Flow proceeds to block 3614.

At block 3614, after receiving the information associated with the analyzed program, the processor loads the phase detectors 1414 with the phase identifiers 1412 of FIG. 14 as described above with respect to FIGS. 13 through 14. Flow ends at block 3614.

Figure 18:
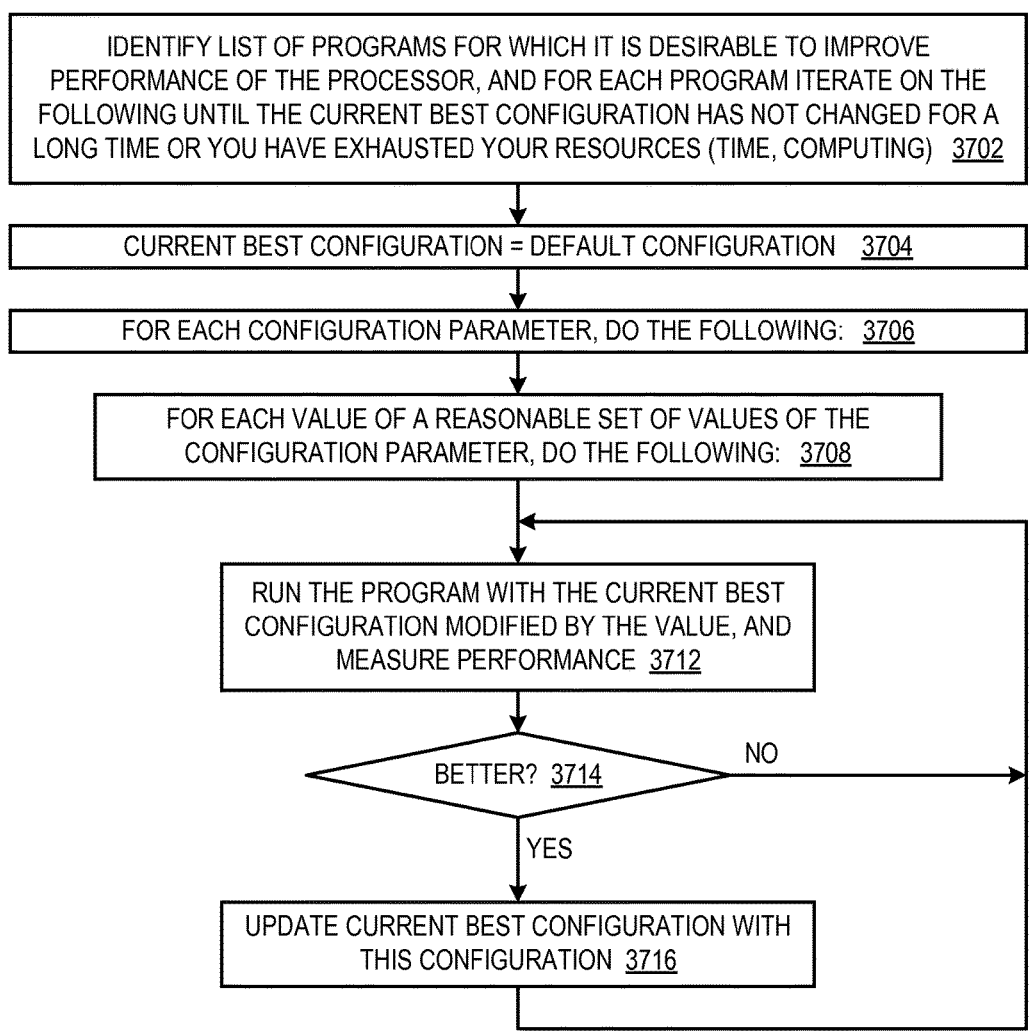
FIG. 18 is a flowchart illustrating a brute force method of determining a good configuration for configurable aspects of the processor, e.g., cache memory, prefetcher.

Referring now to FIG. 18, a flowchart illustrating a brute force method of determining a good configuration for configurable aspects of the processor, e.g., cache memory, prefetcher, is shown. The method described employs aspects of the "coordinate descent" optimization algorithm. Flow begins at block 3702.

At block 3702, for each program, or program phases, in a list of programs identified for which it is desirable to improve performance of the processor, the method iterates through blocks 3704 through 3716 until a good configuration is determined (e.g., the best current configuration—see below—has not changed for a relatively long time) or resources have expired (e.g., time and/or computing resources). Flow proceeds to block 3704.

At block 3704, the current best configuration is set to a default configuration, e.g., a default configuration of the prefetcher, which in one embodiment is simply the configuration with which the processor is manufactured. Flow proceeds to block 3706.

At block 3706, for each configuration parameter, blocks 3708 through 3712 are performed. An example of a configuration parameter is a single configuration bit, e.g., that turns a feature on or off. Another example of a configuration parameter is a configuration field, e.g., MAT scores 108. Flow proceeds to block 3708.

At block 3708, for each value of a reasonable set of values of the configuration parameter of block 3706, perform blocks 3712 through 3716. A reasonable set of values of the configuration parameter depends upon the size of the configuration parameter, the deemed importance of the parameter, and the amount of resources required to iterate through its values. For example, in the case of a single configuration bit, both values are within a reasonable set. For example, the method may try all possible values for any parameter having sixteen or fewer values. However, for relatively large fields, e.g., a 32-bit field, it may be infeasible to try all $2^{32}$ possible values. In this case, the designer may provide a reasonable set of values to the method. For example, the designer may observe groups of MATs with similar characteristics and group them together, as described above, to limit the number of possibilities. If the designer does not supply values and the number of possibilities is large, the method may iterate through blocks 3712 through 3716 with a reasonable number of random values of the parameter. Flow proceeds to block 3712.

At block 3712, the program, or program phase, is run with the current best configuration but modified by the next value of the parameter per block 3708, and the performance is measured. Flow proceeds to decision block 3714.

At decision block 3714, the method compares the performance measured at block 3712 with the current best performance and if the former is better, flow proceeds to block 3716; otherwise, flow returns to block 3712 to try the next value of the current parameter until all the reasonable values are tried, in which case flow returns to block 3708 to iterate on the next configuration parameter until all the configuration parameters are tried, in which case the method ends, yielding the current best configuration for the program, or program phase.

At block 3716, the method updates the current best configuration with the configuration tried at block 3712. Flow returns to block 3712 to try the next value of the current parameter until all the reasonable values are tried, in which case flow returns to block 3708 to iterate on the next configuration parameter until all the configuration parameters are tried, in which case the method ends, yielding the current best configuration for the program, or program phase.

It should be noted that a good configuration found using methods similar to those of FIG. 18 may not be, and need not be, understood by the designer why the particular configuration yields the good result.

Referring now to FIG. 19, a pie chart 3801 illustrating analysis results is shown. The results of the various analyses, such as those performed according to FIGS. 15, 17 and 18, may be conceptualized as a pie chart having a slice for each MAT, i.e., a percentage of the pie for each MAT. The pie chart 3801 includes a slice for different MAT groups. In the example of FIG. 19, a prefetch group is 42%, a code group is 19%, a floating point group is 23%, a streaming data group is 11%, and a stack and tablewalk group is 5%.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A processor, comprising:
 a plurality of prefetchers that respectively prefetches data in response to a plurality of memory accesses, wherein each of the plurality of memory accesses includes a memory access type (MAT), and the MAT is one of a plurality of predetermined MATs, wherein the MAT is a characteristic of each memory access;
 a table that holds scores that indicate effectiveness of each of the plurality of prefetchers to prefetch data with respect to the plurality of predetermined MATs; and
 wherein a score corresponding to a current prefetcher is found from the table based on the MAT of each of the plurality of memory accesses to decide whether to prefetch data by the current prefetcher or not, and the current prefetcher prefetches data in response to each of the plurality of memory accesses at a level of aggressiveness based on the scores held in the table and the MATs of each of the plurality of memory accesses.

2. The processor of claim 1, wherein the processor is configured with the scores held in the table at manufacturing time.

3. The processor of claim 1, wherein the processor updates the scores held in the table with program-specific values obtained by analysis of the program.

4. The processor of claim 1, wherein the processor dynamically updates the scores held in the table during its operation based on the effectiveness of each of the plurality of prefetchers for recently processed memory accesses with respect to the plurality of predetermined MATs.

5. The processor of claim 1, wherein for each MAT of the plurality of MATs, each of the plurality of prefetchers maintains a count of memory accesses to a memory region having the MAT.

6. The processor of claim 5, wherein each of the plurality of prefetchers updates the score in the table with respect to the MAT of the plurality of MATs having the highest count of memory accesses to the region.

7. The processor of claim 6, wherein each of the plurality of prefetchers updates the score in the table when each of the plurality of prefetchers has finished prefetching from the memory region.

8. The processor of claim 1, wherein the level of aggressiveness at which each of the plurality of prefetchers prefetches data includes at least one of the following list: a prefetch count, a maximum prefetch distance, or a combination thereof.

9. The processor of claim 1, wherein the level of aggressiveness at which each of the plurality of prefetchers prefetches data is affected by current utilization of one or more resources of the processor used to prefetch.

10. The processor of claim 1, wherein the level of aggressiveness at which each of the plurality of prefetchers prefetches data is affected by a minimum pattern period required for the prefetcher to lock onto an access pattern.

11. The processor of claim 1, wherein each of the plurality of prefetchers updates the score in the table with respect to each MAT of the plurality of MATs for which a memory access to a region occurred.

12. The processor of claim 1, wherein each of the plurality of prefetchers updates the score in the table with respect to each MAT of the plurality of MATs for which at least a threshold number of memory accesses to a region occurred.

13. The processor of claim 1, wherein each of the plurality of prefetchers includes a plurality of entries, wherein each entry of the plurality of entries is allocatable for use to prefetch data from an associated memory region.

14. The processor of claim 13, wherein each of the plurality of prefetchers is configured to allocate a first entry and a second entry of the plurality of entries for use to prefetch data from a same memory region, but wherein the first entry prefetches from the same memory region in response to a first one or more of the plurality of MATs and the second entry prefetches from the same memory region in response to a second one or more of the plurality of MATs, wherein the first and second one or more of the plurality of MATs are mutually exclusive.

15. A method for operating a processor that includes a plurality of prefetchers that respectively prefetches data in response to a plurality of memory accesses, wherein each of the plurality of memory accesses includes a memory access type (MAT), and the MAT is one of a plurality of predetermined MATs, wherein the MAT is a characteristic of each memory access, the method comprising:
 maintaining a table that holds scores that indicate effectiveness of each of the plurality of prefetchers to prefetch data with respect to the plurality of predetermined MATs;
 finding a score corresponding to a current prefetcher from the table based on the MAT of each of the plurality of memory accesses to decide whether to prefetch data by the current prefetcher or not; and
 prefetching, by the current prefetcher, data in response to each of the plurality of memory accesses at a level of aggressiveness based on the scores held in the table and the MATs of each of the plurality of memory accesses.

16. The method of claim 15, further comprising:
 updating the scores held in the table with program-specific values obtained by offline analysis of the program with respect to the plurality of predetermined MATs.

17. The method of claim 16, further comprising:
 determining that the program or a phase of the program is running on the processor; and
 said updating the scores held in the table with program-specific values obtained by analysis of the program with respect to the plurality of predetermined MATs, in response to said determining.

18. The method of claim 15, further comprising:
 updating the scores held in the table during operation of the processor based on the effectiveness of each of the plurality of prefetchers for recently processed memory accesses with respect to the plurality of predetermined MATs.

19. The method of claim 15, further comprising:
 for each MAT of the plurality of MATs, maintaining a count of memory accesses to a memory region having the MAT.

20. The method of claim 19, further comprising:
 updating the score in the table with respect to the MAT of the plurality of MATs having the highest count of memory accesses to the region.

21. The method of claim 20, further comprising:
 updating the score in the table when each of the plurality of prefetchers has finished prefetching from the memory region.

22. The method of claim 15, further comprising:
 updating the score in the table with respect to each MAT of the plurality of MATs for which a memory access to a region occurred.

23. The method of claim 15, further comprising:
 updating the score in the table with respect to each MAT of the plurality of MATs for which at least a threshold number of memory accesses to a region occurred.

24. The method of claim 15, wherein each of the plurality of prefetchers includes a plurality of entries, wherein each entry of the plurality of entries is allocatable for use to prefetch data from an associated memory region, the method further comprising:
 allocating first and second of the plurality of entries for use to prefetch data from a same memory region;
 the first entry prefetching from the same memory region in response to a first one or more of the plurality of MATs; and
 the second entry prefetching from the same memory region in response to a second one or more of the plurality of MATs; and
 wherein the first and second one or more of the plurality of MATs are mutually exclusive.

25. A computer program product encoded in at least one nor-transitory computer usable medium for use with a computing device, the computer program product comprising:
 computer usable program code embodied in said medium, for specifying a processor, the computer usable program code comprising:
 first program code for specifying a plurality of prefetchers that respectively prefetches data in response to a plurality of memory accesses, wherein each of the plurality of memory accesses includes a memory access type (MAT), and the MAT is one of a plurality of predetermined MATs, wherein the MAT is a characteristic of each memory access;
 second program code for specifying a table that holds scores that indicate effectiveness of each of the plurality of prefetchers to prefetch data with respect to the plurality of predetermined MATs; and
 wherein a score corresponding to a current prefetcher is found from the table based on the MAT of each of the plurality of memory accesses to decide whether to prefetch data by the current prefetcher or not, and the current prefetcher prefetches data in response to each of the plurality of memory accesses at a level of aggressiveness based on the scores held in the table and the MATs of each of the plurality of memory accesses.

* * * * *